(12) United States Patent
Obata

(10) Patent No.: US 10,081,268 B2
(45) Date of Patent: Sep. 25, 2018

(54) MANAGEMENT DEVICE FOR SECONDARY BATTERY

(71) Applicant: TOYOTA JIDOSHA KABUSHIKI KAISHA, Toyota-shi, Aichi-ken (JP)

(72) Inventor: Hiroyuki Obata, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 25 days.

(21) Appl. No.: 15/340,545

(22) Filed: Nov. 1, 2016

(65) Prior Publication Data

US 2017/0120774 A1   May 4, 2017

(30) Foreign Application Priority Data

Nov. 2, 2015   (JP) ................. 2015-215528

(51) Int. Cl.
```
B60L 11/18      (2006.01)
H01M 10/613     (2014.01)
H01M 10/625     (2014.01)
H01M 10/48      (2006.01)
H01M 10/63      (2014.01)
H01M 10/6563    (2014.01)
H01M 10/42      (2006.01)
```

(52) U.S. Cl.
CPC ....... *B60L 11/1874* (2013.01); *B60L 11/1861* (2013.01); *H01M 10/48* (2013.01); *H01M 10/613* (2015.04); *H01M 10/625* (2015.04); *H01M 10/63* (2015.04); *H01M 10/6563* (2015.04); *H01M 2010/4271* (2013.01); *H01M 2220/20* (2013.01)

(58) Field of Classification Search
CPC .. H01M 10/613; H01M 10/625; H01M 10/48; H01M 10/63; H01M 10/6563; H01M 2010/4271; H01M 2220/20
See application file for complete search history.

(56) References Cited

FOREIGN PATENT DOCUMENTS

| | | |
|---|---|---|
| JP | 2007-48485 A | 2/2007 |
| JP | 2013-225397 A | 10/2013 |
| WO | 2014027389 A1 | 2/2014 |

*Primary Examiner* — Jane Rhee
(74) *Attorney, Agent, or Firm* — Sughrue Mion, PLLC

(57) ABSTRACT

A battery management device for a battery that is incorporated in a vehicle includes a cooling fan configured to cool the battery and a controller configured to control the cooling fan. The controller is configured to calculate an amount of high-rate degradation damage which is an amount of degradation damage to the battery caused by high-rate charge or discharge, and is configured to restrict cooling of the battery by the cooling fan when the amount of high-rate degradation damage has reached or exceeded a predefined cooling restriction starting threshold, more strictly than when the amount of high-rate degradation damage is less than the cooling restriction starting threshold.

5 Claims, 10 Drawing Sheets

MANAGEMENT DEVICE FOR SECONDARY BATTERY

CROSS REFERENCE TO RELATED APPLICATION

The entire disclosure of Japanese Patent Application No. 2015-215528 filed on Nov. 2, 2015 including the specification, claims, drawings, and abstract is incorporated herein by reference in its entirety.

TECHNICAL FIELD

The present disclosure relates to a management device for managing a secondary battery that is incorporated in a vehicle.

BACKGROUND

In recent years, many electrically powered vehicles are used, including electric vehicles whose drive source is a motor and hybrid electric vehicles whose drive sources are an engine and a motor. Such an electrically powered vehicle incorporates a chargeable and dischargeable secondary battery such as a lithium-ion battery. It is known that such secondary batteries degrade as they are repeatedly charged and discharged, and the degradation gradually lowers the battery capacity or increases the internal resistance. Such degradation of secondary batteries includes high-rate degradation and material degradation. The high-rate degradation proceeds as a secondary battery is repeatedly used with a large charging or discharging current, or at a high rate. The high-rate degradation is a phenomenon in which the concentration of salt in a liquid electrolyte in a secondary battery becomes uneven when a large discharging current or a large charging current flows, and the gradient in the concentration of salt causes an increase in the internal resistance. The material degradation is degradation of material in constituent components of a secondary battery, and occurs depending on the electric current value or the temperature.

To make better use of a secondary battery, techniques for monitoring the amount of damage resulting from the high-rate degradation or the amount of damage resulting from the material degradation have been proposed. For example, JP 2013-225397 A discloses a technique of monitoring the amount of high-rate degradation damage and the amount of material degradation damage to thereby lower the upper limit of discharge power when the amount of high-rate degradation damage exceeds a predetermined threshold, in which the threshold is changed in accordance with the amount of material degradation damage. By employing this technique, the progress of the high-rate degradation is retarded because discharge power is restricted if the amount of high-rate degradation damage becomes too high.

However, according to JP 2013-225397 A, although discharge power is restricted when the amount of high-rate degradation damage exceeds the threshold, control for retarding the high-rate degradation is not specifically performed until the amount of high-rate degradation damage exceeds the threshold. The technique of JP 2013-225397 A therefore has a problem in that fuel efficiency or vehicle performance is reduced as the restriction of discharge power is started relatively easily.

SUMMARY

Technical Problem

Under the above-described circumstances, an object of the present disclosure is to provide a secondary battery management device that can more effectively retard the progress of the high-rate degradation.

Solution to Problem

According to one aspect of the present disclosure, there is provided a secondary battery management device for a secondary battery that is incorporated in a vehicle. The secondary battery management device includes a cooling mechanism configured to cool the secondary battery, and a controller configured to control the cooling mechanism. The controller is configured to calculate an amount of high-rate degradation damage which is an amount of degradation damage to the secondary battery caused by high-rate charge or discharge, and is configured to restrict cooling of the secondary battery by the cooling mechanism when the amount of high-rate degradation damage has reached or exceeded a predefined cooling restriction starting threshold, more strictly than when the amount of high-rate degradation damage is less than the cooling restriction starting threshold.

By employing such a structure, the progress of high-rate degradation that tends to proceed at low temperature can be retarded.

According to another aspect, the controller may be configured to calculate an amount of material degradation damage to the secondary battery, and may be configured to cool the secondary battery without restricting the cooling regardless of the amount of high-rate degradation damage when the amount of material degradation damage has reached or exceeded a predefined power restriction starting threshold for material degradation.

By employing such a structure, the progress of severe degradation to the secondary battery is retarded because cooling is started quickly when the amount of material degradation damage is large and cooling should be performed quickly.

According to still another aspect, the controller may be configured to increase an amount of restriction on the cooling by the cooling mechanism as the amount of high-rate degradation damage increases.

By employing such a structure, the amount of high-rate degradation damage is prevented from becoming too large, because lowering of the temperature of the secondary battery is retarded as the amount of high-rate degradation damage increases.

According to still another aspect, the controller may be configured to perform power restriction to lower a permissible value for at least one of input power and output power to and from the secondary battery when the amount of high-rate degradation damage has reached or exceeded a predefined power restriction starting threshold for high-rate degradation. Two or more additional thresholds may be set between the cooling restriction starting threshold and the power restriction starting threshold for high-rate degradation. The controller may be configured to increase an amount of restriction on the cooling by the cooling mechanism stepwise each time the amount of high-rate degradation damage exceeds one of the additional thresholds. An interval between one additional threshold and the next additional threshold may be set to be smaller as the amount of high-rate degradation damage approaches the power restriction starting threshold for high-rate degradation.

By employing such a structure, occurrence of input power restriction is prevented more effectively, because cooling is restricted to a large extent if the amount of high-rate degradation damage approaches the power restriction starting threshold for high-rate degradation.

According to still another aspect, the controller may be configured to restrict the cooling of the secondary battery by the cooling mechanism only when the amount of high-rate degradation damage is caused by an excess of charge.

By employing such a structure, the control can be simplified, because the determination of the necessity for cooling restriction can be performed only when necessary.

According to the present disclosure, the progress of high-rate degradation that tends to proceed at low temperature can be retarded, because cooling of the secondary battery is restricted when the amount of high-rate degradation damage has reached or exceeded the cooling restriction starting threshold.

BRIEF DESCRIPTION OF DRAWINGS

Embodiments of the present disclosure will be described by reference to the following figures, wherein.

DESCRIPTION OF EMBODIMENTS

Figure 1:
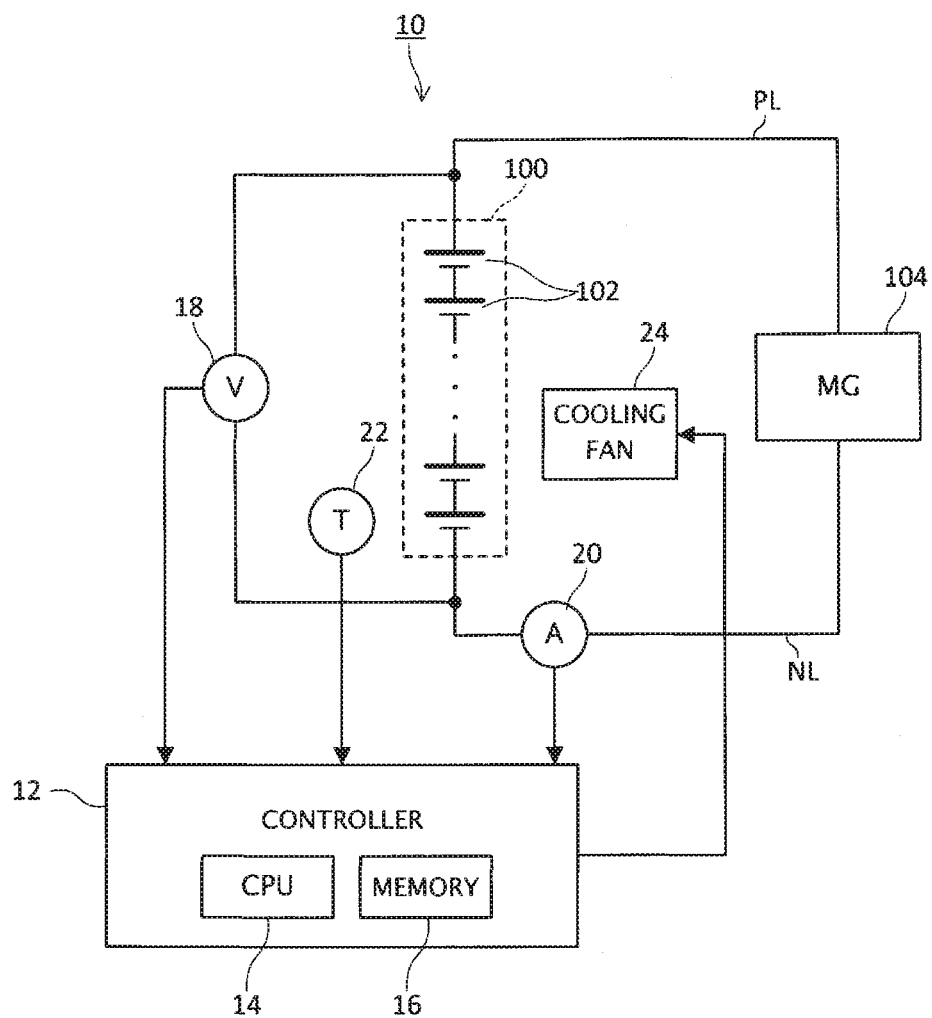
FIG. 1 illustrates a structure of a secondary battery management device according to a first embodiment.

A first embodiment will be described below with reference to the accompanying drawings. FIG. 1 illustrates a structure of a secondary battery management device 10 according to the first embodiment. The secondary battery management device 10 is incorporated in an electrically powered vehicle such as a hybrid electric vehicle or an electric vehicle.

A battery 100 that is to be managed is a chargeable and dischargeable secondary battery such as a lithium-ion battery. A motor generator 104 receives electric power output from the battery 100 to drive the vehicle and converts kinetic energy produced upon braking of the vehicle into electric power to charge the battery 100. As such, the battery 100 will be repeatedly charged and discharged while the vehicle is moving. A current Ib from the battery 100 is positive (+) when discharging the battery 100, and is negative (−) when charging the battery 100. The battery 100 is connected to the motor generator 104 serving as a vehicle driving motor via a positive electrode line PL and a negative electrode line NL.

The secondary battery management device 10 includes a voltage sensor 18 for detecting a battery voltage Vb, a current sensor 20 for detecting a charging or discharging current Ib of the battery 100, a temperature sensor 22 for detecting a temperature of the battery 100 ("battery temperature Tb"), a cooling fan 24 for cooling the battery 100, and a controller 12. Values obtained by these sensors are input to the controller 12 and are used for control, which will be described later. The cooling fan 24 is a cooling mechanism for cooling the battery 100 in accordance with a control signal output from the controller 12.

The controller 12 is a computer that includes a CPU 14 for performing various operations and a memory 16 for storing, for example, various programs and control parameters. The controller 12 calculates, for example, an SOC of the battery 100 or an amount of degradation damage based on the battery temperature Tb, the voltage value Vb, and the electric current value Ib of the battery 100, which will be described in detail below. The charging or discharging of the battery 100 or the driving of the cooling fan 24 is controlled in accordance with the obtained SOC or amount of degradation damage.

It is known that the battery 100 degrades as it is repeatedly charged and discharged, and the degradation gradually lowers the battery capacity or increases the internal resistance. Such degradation of the battery 100 includes high-rate degradation and material degradation. The high-rate degradation proceeds as the battery is repeatedly used with a large charging or discharging current, or at a high rate, and is a phenomenon in which the concentration of salt in a liquid electrolyte in a secondary battery becomes uneven when a large charging or discharging current flows, and the gradient in the concentration of salt causes an increase in the internal resistance of the battery. The material degradation is degradation of material in constituent components of the battery 100, and occurs depending on the electric current value Ib, the SOC, or the temperature Tb.

To retard such degradation, the controller 12 controls charging or discharging power by detecting the electric current value Ib, the voltage value Vb, and the temperature Tb of the battery 100. In particular, for the material degradation, the amount of material degradation damage R is maintained to be less than a certain level for a long period of time by, for example, driving the cooling fan 24 to cool the battery 100 if the battery temperature Tb reaches a predefined cooling starting temperature Tn.

However, for vehicles that are used for a long time, even if the above-described control is performed, the amount of degradation damage, or in particular, the amount of high-rate degradation damage $|\Sigma D|$, may reach or exceed a predefined power restriction starting threshold. In this case, the controller 12 performs power restriction to lower at least one of a permissible input power value Win and a permissible output power value Wout to retard a further progress of the degradation of the battery 100. In this case, while the progress of the degradation of the battery 100 is retarded, other problems arise in that, for example, fuel efficiency is reduced. As such, the control should minimize such power restriction.

In the illustrated embodiment, the lower the temperature of the battery 100, the easier it is for the high-rate degradation of the battery 100 to proceed. As such, in the illustrated embodiment, when the amount of high-rate degradation damage $|\Sigma D|$ has reached or exceeded a predefined cooling restriction starting threshold $\Sigma Dc1$, the cooling of the battery 100 by the cooling fan 24 is restricted to retard the progress of the high-rate degradation. The retardation of the progress of the high-rate degradation will be described in detail below.

First, the calculation of the amount of high-rate degradation damage |ΣD| will be described below. To calculate the amount of high-rate degradation damage |ΣD|, first, an evaluation value D, which represents the amount of high-rate degradation damage that has occurred in one period, is calculated for each predetermined period Δt using the following equation (1):

$$D[t]=D[t-\Delta t]-\alpha \times \Delta t \times D[t-\Delta t]+\beta/C \times Ib \times \Delta t \quad (1)$$

In the above equation (1), t represents time, and D[t−Δt] represents a previously calculated evaluation value, α represents a forgetting factor, β represents an electric current factor, Ib represents a charging or discharging current of the battery 100 (positive during discharging and negative during charging), and C represents a limit threshold. As can been understood from the above equation (1), the evaluation value D[t] that is being calculated is calculated based on the previous evaluation value D[t−Δt]. The initial value for the evaluation value, D[0], can be set to, for example, 0.

The gradient in the concentration of salt in the liquid electrolyte is moderated as ions diffuse over time, and therefore the amount of damage decreases over time. The second term on the right side of the above equation (1) is a term for taking into consideration a decrease in amount of damage during a predetermined period Δt. The forgetting factor α represents a factor that corresponds to the diffusion rate at which ions diffuse in the liquid electrolyte of the battery 100. The higher the diffusion rate, the greater the forgetting factor α. The value α×Δt is set to range from 0 to 1. The closer to 1 the value α×Δt, the greater the absolute value of the second term on the right side. The greater the value for the forgetting factor α or the longer the period Δt, the closer to 1 the value α×Δt.

Figure 2:
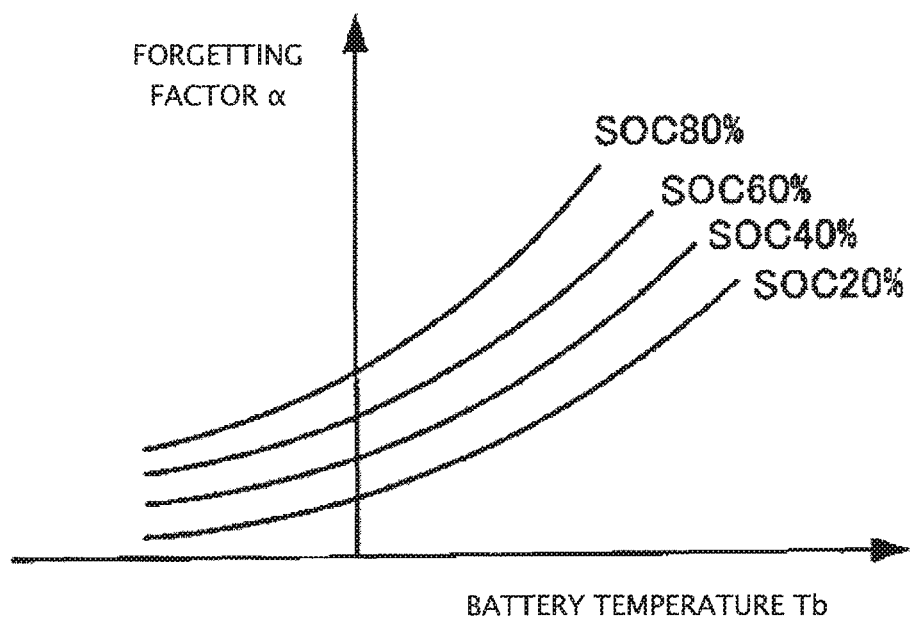
FIG. 2 illustrates an example map of a forgetting factor α.

The forgetting factor α is stored in the memory 16 in the form of a map. FIG. 2 illustrates an example map of the forgetting factor α. As is clear from FIG. 2, the forgetting factor α depends on the SOC of the battery 100 and the battery temperature Tb. The higher the SOC or the higher the battery temperature Tb, the higher the forgetting factor α. The value for the forgetting factor α is determined beforehand through experiments or simulations. Alternatively, the forgetting factor α may be stored in the form of, for example, a function including the battery temperature Tb and the SOC as variables, instead of the map illustrated in FIG. 2.

The greater the absolute value of the electric current value, the greater the gradient in the concentration of salt in the liquid electrolyte. The gradient in the concentration of salt during discharging and the gradient in the concentration of salt during charging are in opposite directions. As such, the third term on the right side of the equation (1) takes a positive value to increase the evaluation value D during discharging in which the current Ib is positive (+), and the third term on the right side of the equation (1) takes a negative value to decrease the evaluation value D during charging in which the current Ib is negative (−). Therefore, the evaluation value D is positive (+) when a high-rate discharging current flows, and the evaluation value D is negative (−) when a high-rate charging current flows.

Figure 3:
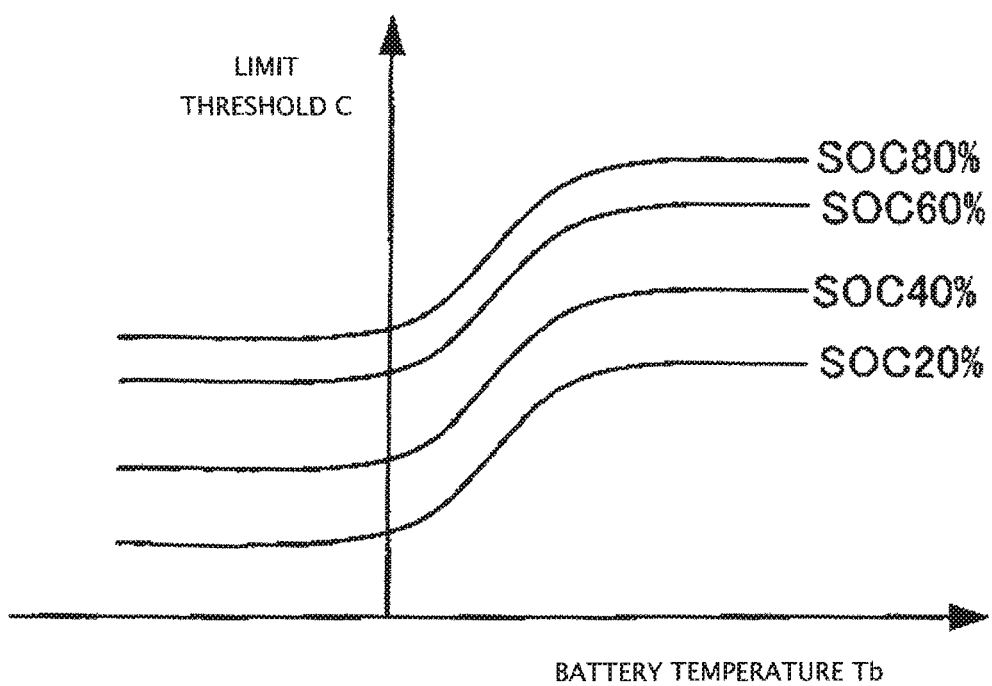
FIG. 3 illustrates an example map of a limit threshold C.

The electric current factor β and the limit threshold C in the third term on the right side of the equation (1) depend on the SOC of the battery 100 and the temperature Tb. As such, similarly as with the forgetting factor α, a correspondence relationship of the electric current factor β and the limit threshold C with at least one of the SOC and the temperature Tb may be determined beforehand through, for example, experiments and stored in the memory 16 in the form of a map or a function. FIG. 3 illustrates an example map of the limit threshold C. As is clear from FIG. 3, the limit threshold C depends on the SOC of the battery 100 and the battery temperature Tb. The higher the SOC or the higher the battery temperature Tb, the higher the limit threshold C.

The amount of high-rate degradation damage |ΣD| is the absolute value of ΣD that is obtained by summation of the evaluation values D described above. ΣD is calculated for each predetermined period Δt in accordance with the following equation (2):

$$\Sigma D[t]=\gamma \times \Sigma D[t-\Delta t]+\eta \times D[t-\Delta t] \quad (2)$$

In the above equation (2), γ is an attenuation factor that assumes a value of less than 1 and is set based on the prediction of the extent to which the gradient in the concentration of salt is moderated as ions diffuse over time, and η is a correction factor. Both the attenuation factor γ and the correction factor η are stored beforehand in the memory 16.

As described above, the evaluation value D is positive (+) when a high-rate discharging current flows, and the evaluation value D is negative (−) when a high-rate charging current flows. ΣD tends toward positive when a high-rate discharging current flows, and tends toward negative when a high-rate charging current flows. In other words, the amount of high-rate degradation damage |ΣD| includes an amount of discharge excess damage for which ΣD is positive (+) and an amount of charge excess damage for which ΣD is negative (−). When ΣD is negative (when charge excess damage has accumulated), the amount of high-rate degradation damage |ΣD| decreases as a high-rate discharging current flows, and increases as a high-rate charging current flows. When ΣD is positive (when discharge excess damage has accumulated), the amount of high-rate degradation damage |ΣD| increases as a high-rate discharging current flows, and decreases as a high-rate charging current flows.

Next, the calculation of the amount of material degradation damage R will be described below. The material degradation is degradation of material in constituent components of the battery 100, and includes storage degradation that occurs when no charge or discharge is performed, and energization degradation that occurs when charge or discharge is performed (when a current flows). The storage degradation can be determined based on the battery temperature Tb and the SOC measured when no charge or discharge is performed, or, in other words, based on the battery temperature Tb and the SOC measured when the vehicle is left unused. The storage degradation can be determined by preparing beforehand a map or a function representing a correspondence relationship of the storage degradation with the battery temperature Tb and the SOC measured when no charge or discharge is performed. Because the resistance of the battery 100 increases when the storage degradation occurs, the storage degradation can be defined by, for example, the rate of resistance increase.

The energization degradation can be determined based on the battery temperature Tb and the amount of passing current measured when charge or discharge is performed. The energization degradation can be determined by preparing beforehand a map or a function representing a correspondence relationship of the energization degradation with the battery temperature Tb and the amount of passing current measured when charge or discharge is performed. Because the resistance of the battery 100 increases when the energization degradation occurs, the energization degradation can be defined by, for example, the rate of resistance increase. A summation value of the storage degradation and the energization degradation is the amount of material degradation damage R.

The controller 12 monitors the amount of high-rate degradation damage |ΣD| and the amount of material degradation damage R, and restricts input or output power of the battery 100 when those amounts of damage exceed predefined power restriction starting thresholds ΣDs and Rs. Specifically, the controller 12 restricts the permissible output power value Wout to retard the progress of the high-rate degradation damage when the amount of discharge excess damage |ΣD| has reached or exceeded the predefined power restriction starting threshold ΣDs; in other words, when ΣD>0 and |ΣD|≥ΣDs. The controller 12 restricts the permissible input power value Win to retard the progress of the high-rate degradation damage when the amount of charge excess damage |ΣD| has reached or exceeded the predefined power restriction starting threshold/Ds; in other words, when ΣD<0 and |ΣD|≥ΣDs. The controller 12 restricts the permissible input and output power values Win and Wout to prevent a further progress of the material degradation when the amount of material degradation damage R has reached or exceeded the predefined power restriction starting threshold Rs. However, many approaches have been proposed for controlling the amount of material degradation damage R so as not to exceed the power restriction starting threshold Rs, and the amount of material degradation damage R rarely exceeds the power restriction starting threshold Rs under the present circumstances.

On the other hand, for vehicles that are used for long time, the high-rate degradation damage may exceed the power restriction starting threshold ΣDs, resulting in restriction of the permissible input and output power values Win and Wout. The restriction of the permissible input and output power values Win and Wout may cause another problem such as reduction in fuel efficiency.

Typically, cooling of the battery 100 is started when the battery temperature Tb reaches a predefined cooling starting temperature Tn. There are some types of batteries 100 in which only one of charge excess damage or discharge excess damage tends to accumulate near the cooling starting temperature Tn. For example, for the battery 100 according to the illustrated embodiment, charge excess damage tends to accumulate near the cooling starting temperature Tn. In this type of battery 100, damage tends to accumulate (|ΣD| tends to increase) as the battery temperature Tb lowers.

Therefore, in the illustrated embodiment, cooling of the battery 100 by the cooling fan 24 is restricted to retard lowering of the battery temperature Tb and, in turn, retard the progress of the high-rate degradation when the amount of high-rate degradation damage |ΣD| has reached or exceeded the predefined cooling restriction starting threshold ΣDc1. A process of cooling of the battery 100 according to the first embodiment will be described below with reference to FIG. 4.

Figure 4:
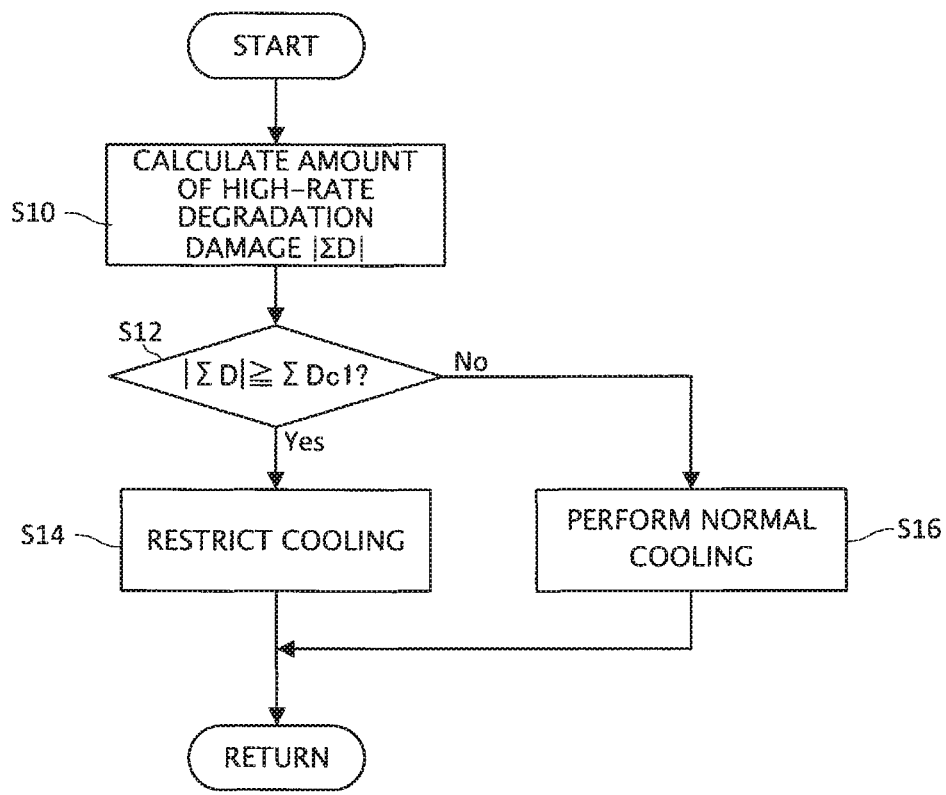
FIG. 4 is a flowchart illustrating a process of cooling of a battery according to the first embodiment.

As illustrated in FIG. 4, to cool the battery 100, first, the controller 12 calculates an amount of high-rate degradation damage |ΣD| (S10). The amount of damage |ΣD| is calculated in the manner described above. Next, the controller 12 determines whether or not the obtained amount of high-rate degradation damage |ΣD| has reached or exceeded a predefined cooling restriction starting threshold ΣDc1 (S12). The cooling restriction starting threshold ΣDc1 is a threshold at or above which cooling restriction is started, and is sufficiently smaller than the power restriction starting threshold ΣDs. The retardation of the progress of the high-rate degradation is unnecessary when the amount of high-rate degradation damage |ΣD| is less than the cooling restriction starting threshold ΣDc1. Therefore, when |ΣD|<ΣDc1, the controller 12 does not restrict cooling and performs normal cooling (S16).

On the other hand, when |ΣD|>ΣDc1, the controller 12 restricts cooling to retard lowering of the battery temperature Tb. The cooling restriction can be performed by changing values for control parameters associated with cooling. More specifically, while, during normal cooling, the cooling fan 24 is driven at a rotation speed F determined in accordance with a difference value ΔTb between a current battery temperature Tb and a target temperature T* if the battery temperature Tb exceeds the predetermined cooling starting temperature Tn, cooling may be restricted by, for example, raising the cooling starting temperature Tn or the target temperature T* to be higher than normal temperatures. In another embodiment, cooling may be restricted by lowering the rotation speed F determined in accordance with the difference value ΔTb. In either case, lowering of the battery temperature Tb is retarded and the progress of the high-rate degradation is retarded by changing values for control parameters associated with cooling and restricting cooling (reducing the cooling performance) (S14). After that, steps S10 through S16 are repeated.

Figure 5:
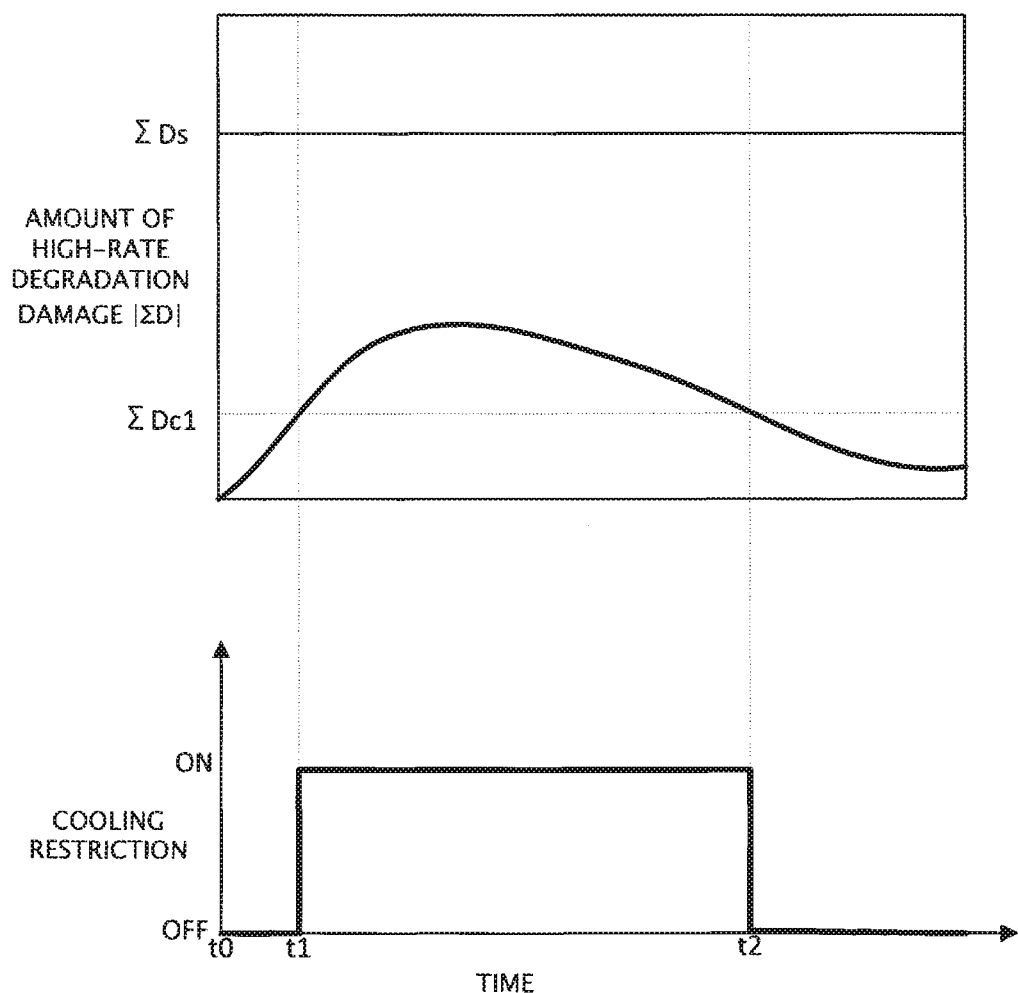
FIG. 5 illustrates a relationship between an amount of high-rate degradation damage and a cooling restriction ON/OFF state.

FIG. 5 illustrates a relationship between an amount of high-rate degradation damage |ΣD| and a cooling restriction ON/OFF state. As illustrated in FIG. 5, at time t1, the amount of high-rate degradation damage |ΣD| reaches a predefined cooling restriction starting threshold ΣDc1, and then, the controller 12 turns the cooling restriction ON or, in other words, restricts cooling of the battery 100 by, for example, raising the cooling starting temperature Tn from an initial value T0. After that, the amount of high-rate degradation damage |ΣD| decreases over time, and, at time t2, the amount of high-rate degradation damage |ΣD| becomes less than the cooling restriction starting threshold ΣDc1 (|ΣD|<ΣDc1), and then, the controller 12 turns the cooling restriction OFF or, in other words, performs normal cooling by, for example, returning the cooling starting temperature Tn to the initial value T0. As described above, according to the illustrated embodiment, because cooling of the battery is restricted when the amount of high-rate degradation damage |ΣD| has reached or exceeded the cooling restriction starting threshold ΣDc1, the progress of high-rate degradation that tends to proceed at low temperatures can be prevented effectively.

Figure 6:
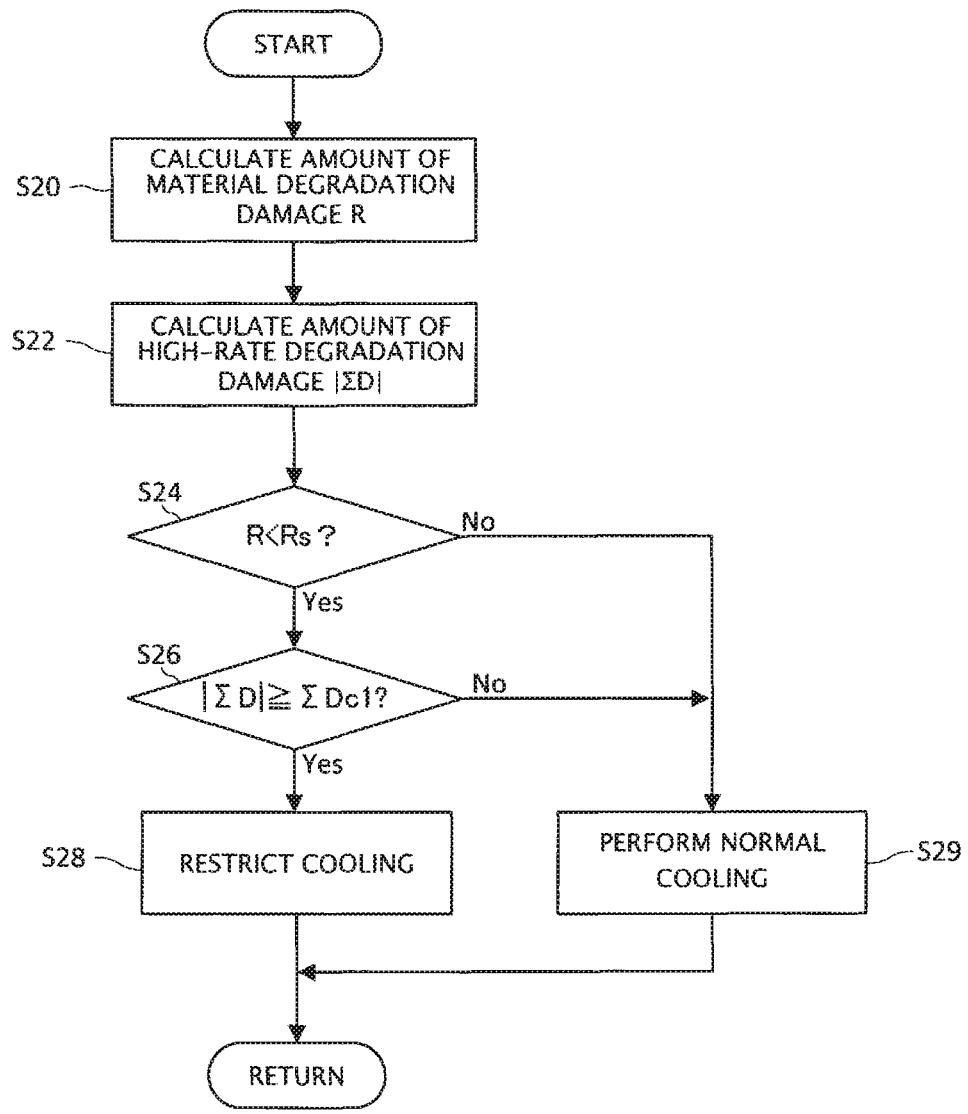
FIG. 6 is a flowchart illustrating a process of cooling of a battery according to a second embodiment.

Next, a second embodiment will be described below with reference to FIG. 6. FIG. 6 is a flowchart illustrating a process of cooling of the battery 100 according to the second embodiment. This embodiment differs from the first embodiment in that cooling is controlled in consideration of not only the amount of high-rate degradation damage |ΣD| but also the amount of material degradation damage R. In this case, first, the controller 12 calculates an amount of material degradation damage R and an amount of high-rate degradation damage |ΣD| (S20 and S22). The amounts of damage R and |ΣD| are calculated in the manner described above.

Next, the controller 12 determines whether or not the obtained amount of material degradation damage R is less than the predefined power restriction starting threshold Rs (S24). If the amount of material degradation damage R has reached or exceeded the power restriction starting threshold Rs (No at step S14), cooling restriction is not performed and normal cooling is performed (S29). When R≥Rs, to retard the progress of material degradation, the battery 100 should be cooled quickly. For that reason, when $R \geq Rs$, the cooling starting temperature Tn is not raised (cooling is not restricted).

On the other hand, when the amount of material degradation damage R is less than the power restriction starting threshold Rs ($R<Rs$), in a similar manner as in the first embodiment, the controller determines whether or not the amount of high-rate degradation damage $|\Sigma D|$ has reached or exceeded a predefined cooling restriction starting threshold $\Sigma Dc1$ (S26). If the amount of high-rate degradation damage $|\Sigma D|$ is less than the cooling restriction starting threshold $\Sigma Dc1$, the controller 12 does not restrict cooling and performs normal cooling (S29). On the other hand, when $|\Sigma D| > \Sigma Dc1$, the controller 12 restricts cooling to retard lowering of the battery temperature Tb (S28). The cooling restriction may be performed by, for example, raising the cooling starting temperature Tn or the cooling target temperature T* from an initial value or lowering the rotation speed F of the fan in a similar manner as in the first embodiment.

Figure 7:
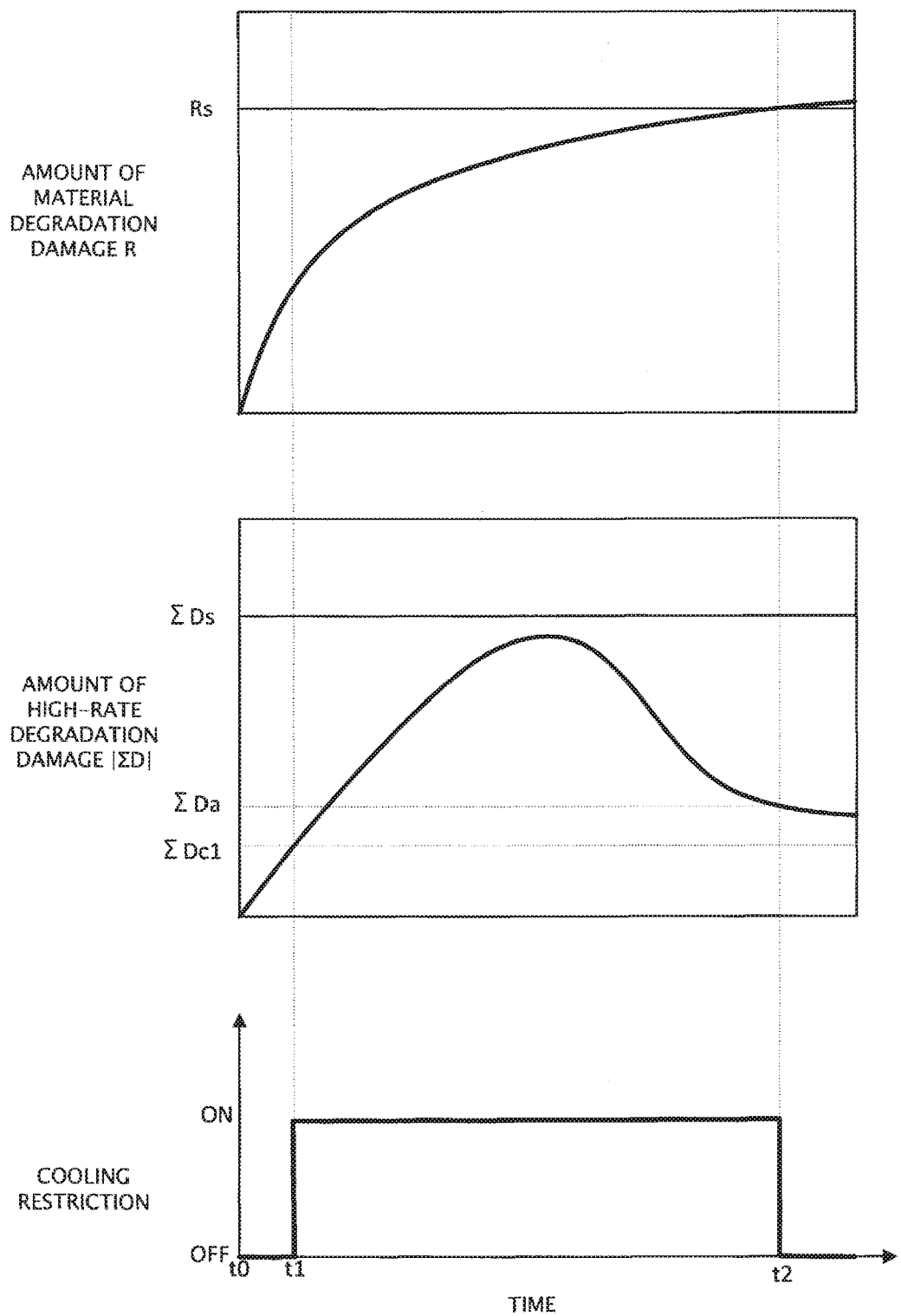
FIG. 7 illustrates a relationship between an amount of material degradation damage, an amount of high-rate degradation damage, and a cooling restriction ON/OFF state.

FIG. 7 illustrates a relationship between an amount of material degradation damage R, an amount of high-rate degradation damage $|\Sigma D|$, and a cooling restriction ON/OFF state. As illustrated in FIG. 7, at time t1, the amount of high-rate degradation damage $|\Sigma D|$ reaches a predefined cooling restriction starting threshold $\Sigma Dc1$, and then, the controller 12 turns the cooling restriction ON or, in other words, restricts cooling of the battery 100 by, for example, raising the cooling starting temperature Tn from an initial value T0. After that, the amount of high-rate degradation damage $|\Sigma D|$ decreases over time. Here, assume that, at time t2, the amount of material degradation damage R reaches the power restriction starting threshold Rs. In this case, even if the relationship $|\Sigma D|<\Sigma Dc1$ does not hold, the controller 12 removes the cooling restriction at time t2 and starts normal cooling. As described above, when the amount of material degradation damage R is large, the progress of material degradation can be retarded by turning the cooling restriction OFF regardless of the amount of high-rate degradation damage $|\Sigma D|$.

Figure 8:
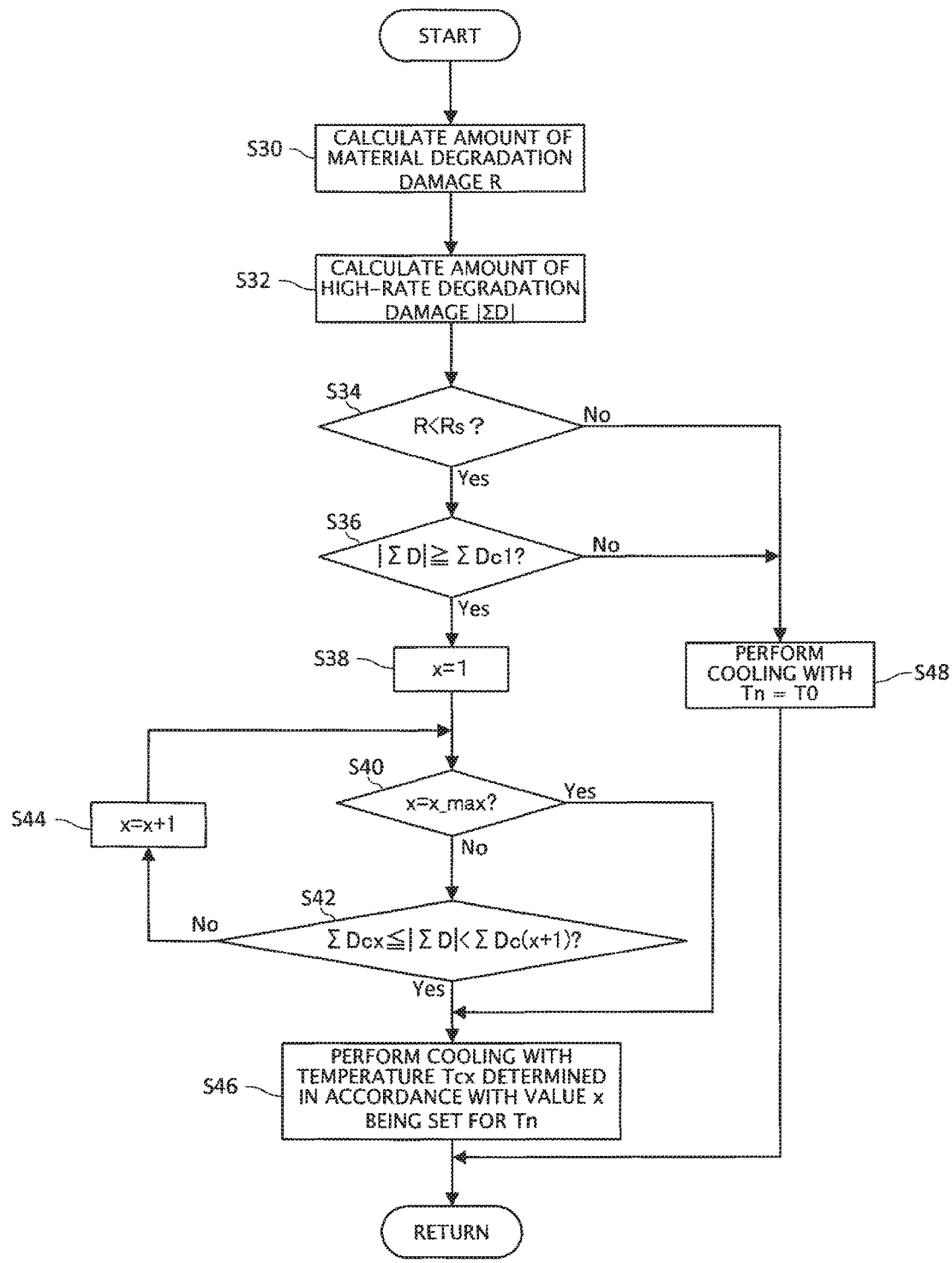
FIG. 8 is a flowchart illustrating a process of cooling of a battery according to a third embodiment.

Next, a third embodiment will be described below with reference to FIG. 8. FIG. 8 is a flowchart illustrating a process of cooling of the battery 100 according to the third embodiment. In this embodiment, the cooling starting temperature Tn is raised stepwise in accordance with the amount of high-rate degradation damage $|\Sigma D|$. First, in a similar manner as in the second embodiment (FIG. 6), the controller 12 calculates an amount of material degradation damage R and an amount of high-rate degradation damage $|\Sigma D|$ (S30 and S32), and compares the amounts of damage R and $|\Sigma D|$ with a predefined power restriction starting threshold Rs and a predefined cooling restriction starting threshold $\Sigma Dc1$ (S34 and S36). If the comparison indicates that $R \geq Rs$ or $|\Sigma D| < \Sigma Dc1$ (No at S34 or No at S36), the controller 12 does not raise the cooling starting temperature Tn (does not restrict cooling) and sets the predefined initial value T0 for the cooling starting temperature Tn (S48). If the battery temperature Tb reaches the initial value T0, the controller 12 starts cooling by the cooling fan 24 and controls, for example, the rotation speed of the cooling fan 24 so that the battery temperature Tb lowers below a permissible value Tmax.

On the other hand, if $R<Rs$ and $|\Sigma D| \geq \Sigma Dc1$ (Yes at S34 and Yes at S36), the controller 12 raises the cooling starting temperature Tn to restrict cooling of the battery 100 and thereby retard the progress of high-rate degradation (S38 through S46). In this case, the cooling starting temperature Tn is determined in accordance with the amount of high-rate degradation damage $|\Sigma D|$. To determine the cooling starting temperature Tn, in the illustrated embodiment, a plurality of temperatures Tcx (x=1, 2, . . . , x_max) and a plurality of thresholds $\Sigma Dcx$ are stored beforehand in the memory 16. The relationships $Tc1<Tc2< \ldots <Tcx\_max$ and $\Sigma Dc1<\Sigma Dc2< \ldots <\Sigma Dcx\_max$ hold. The controller 12 determines whether or not the obtained amount of high-rate degradation damage $|\Sigma D|$ satisfies the relationship $\Sigma Dcx \leq \Sigma Dc1 < \Sigma Dc(x+1)$ (S42), and, if this relationship is satisfied, sets a temperature Tcx determined in accordance with the value x for the cooling starting temperature Tn (S46). If the relationship $\Sigma Dcx \leq |\Sigma D| < \Sigma Dc(x+1)$ is not satisfied, after the value x is incremented (S44), similar determination is performed again (S42). However, if the value x reaches the maximum value (x=x_max) (Yes at S40), the determination ends at that point, and a temperature Tcx_max corresponding to the maximum value x_max is set for the cooling starting temperature Tn. The temperature Tcx stored in the memory 16 is higher than the initial value T0 and is lower than the permissible value Tmax. In other words, the relationships $Tc1>T0$ and $Tcx\_max<Tmax$ hold.

Figure 9:
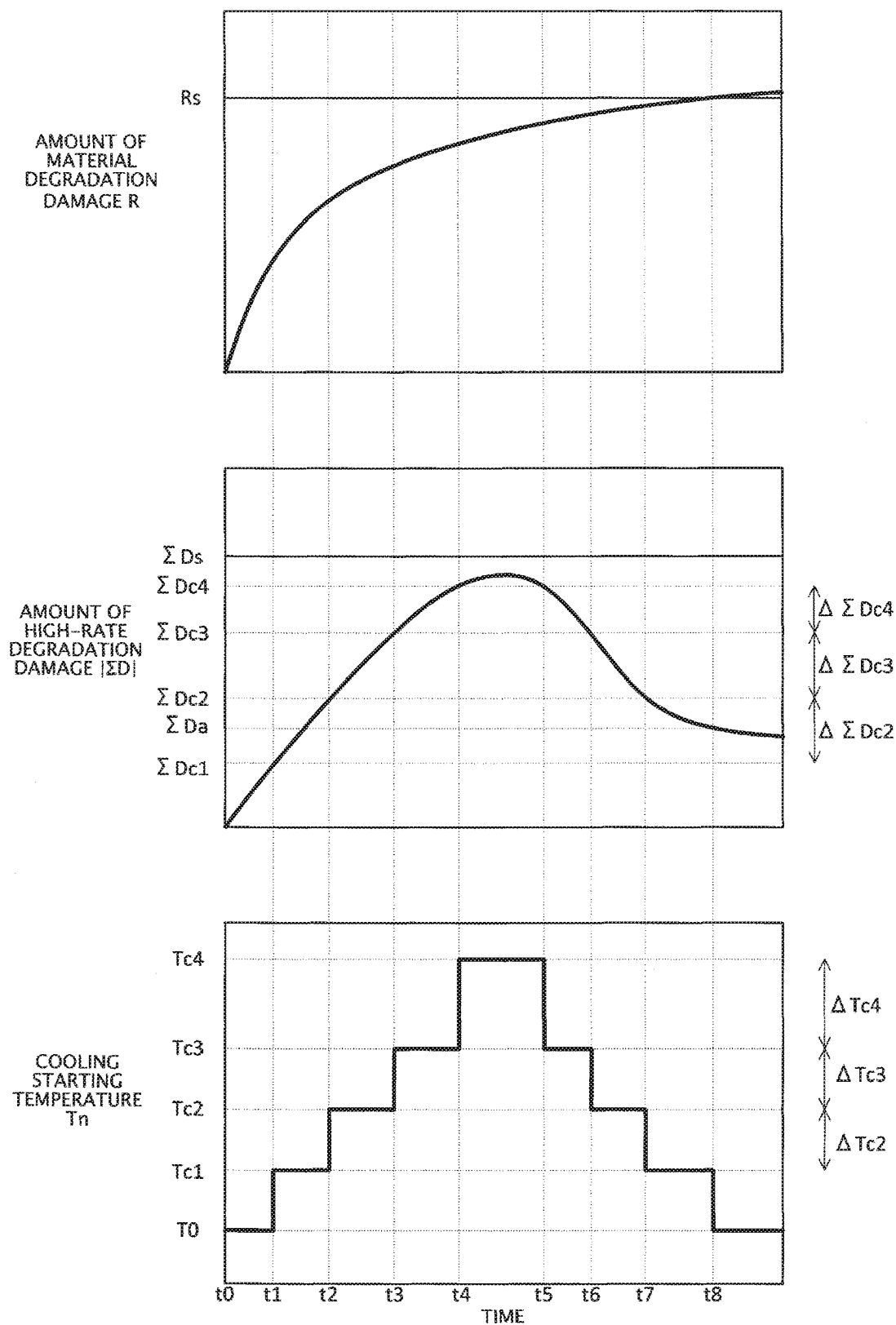
FIG. 9 illustrates an example of a cooling starting temperature varying with an amount of material degradation damage and an amount of high-rate degradation damage.

FIG. 9 illustrates an example of a cooling starting temperature Tn varying with an amount of material degradation damage R and an amount of high-rate degradation damage $|\Sigma D|$. In FIG. 9, the top graph depicts the amount of material degradation damage R, the middle graph depicts the amount of charge excess high-rate degradation damage $|\Sigma D|$, and the bottom graph depicts the cooling starting temperature Tn. As illustrated in FIG. 9, at time t0, the amount of high-rate degradation damage $|\Sigma D|$ is less than the cooling restriction starting threshold $\Sigma Dc1$, and then, the cooling starting temperature Tn is maintained at the initial value T0. After that, at time t1, the amount of high-rate degradation damage $|\Sigma D|$ reaches the cooling restriction starting threshold $\Sigma Dc1$, and then, the controller 12 sets the cooling starting temperature Tn to the temperature Tc1 that is stored beforehand.

After that, the high-rate degradation proceeds further, and, at time t2, the amount of high-rate degradation damage $|\Sigma D|$ reaches an additional threshold $\Sigma Dc2$, and then, the controller 12 sets the cooling starting temperature Tn to the temperature Tc2. Further, the controller 12 sequentially sets Tn=Tc3 at time t3 at which $|\Sigma D|$ reaches an additional threshold $\Sigma Dc3$, and Tn=Tc4 at time t4 at which $|\Sigma D|$ reaches an additional threshold $\Sigma Dc4$. By raising the cooling starting temperature Tn to retard the progress of the high-rate degradation or passing a discharging current, the amount of charge excess high-rate degradation damage $|\Sigma D|$ gradually decreases. At time t5, the high-rate degradation damage $|\Sigma D|$ decreases below the additional threshold $\Sigma Dc4$, and then, the controller 12 lowers the cooling starting temperature Tn from the temperature Tc4 to the temperature Tc3. After that, each time the amount of high-rate degradation damage $|\Sigma D|$ decreases below an additional threshold $\Sigma Dcx$, the controller 12 lowers the cooling starting temperature Tn from the temperature Tcx to Tc(x-1). Here, assume that, at time t8, the amount of material degradation damage R reaches the predefined power restriction starting threshold Rs. In this case, although the high-rate degradation damage $|\Sigma D|$ is $\Sigma Da$ that is greater than the cooling restriction starting threshold $\Sigma Dc1$, the controller 12 sets the cooling starting temperature Tn to the initial value T0.

As is clear from the foregoing description, in the illustrated embodiment, the larger the amount of high-rate degradation damage $|\Sigma D|$, the larger the amount by which the cooling starting temperature Tn is raised (the amount of cooling restriction), and the smaller the amount of high-rate degradation damage |ΣD|, the smaller the amount by which the cooling starting temperature Tn is raised (the amount of cooling restriction). By employing such a structure, cooling can be performed in accordance with the amount of high-rate degradation damage |ΣD|. When the amount of high-rate degradation damage |ΣD| is large, the progress of the high-rate degradation can be retarded by preventing the temperature of the battery 100 from lowering. When the amount of high-rate degradation damage |ΣD| is small, an excessive progress of the material degradation can be avoided by performing a certain level of cooling.

As is clear from FIG. 9, in the illustrated embodiment, the thresholds ΣDcx are at irregular intervals ΔΣDcx=(ΣDcx−ΣDc(x−1)). For example, in the example illustrated in FIG. 9, ΔΣDc2=(ΣDxc2−ΣDxc1) and ΔΣDc3=(ΣDxc3−ΣDxc2) are of the same magnitude, whereas ΔΣDc4=(ΣDxc4−ΣDxc3) is smaller than ΔΣDc2 or ΔΣDc3. In other words, in the illustrated embodiment, an interval ΔΣDcx between one threshold and the next threshold is set to be smaller as the amount of high-rate degradation damage approaches the power restriction starting threshold ΣDs. This is in order to more frequently raise the cooling starting temperature Tn near the power restriction starting threshold ΣDs to prevent |ΣD| from reaching the power restriction starting threshold ΣDs. By employing such a structure, occurrence of power restriction can be prevented more effectively, and, in turn, reduction in fuel efficiency can be prevented more effectively. Although, in the illustrated embodiment, ΔΣDc2 and ΔΣDc3 are the same value, ΔΣDc3 may be smaller than ΔΣDc2. In other words, the relationship ΔΣDc2>ΔΣDc3>ΔΣDc4 may hold.

In the illustrated embodiment, an interval ΔTcx=Tcx−Tc(x−1) between temperatures Tcx is set to be larger for the temperatures Tcx that are closer to Tcx_max. For example, in the example illustrated in FIG. 9, ΔTc2=(Tc2−Tc1) and ΔTc3=(Tc3−Tc2) are of the same magnitude, whereas ΔTc4=(Tc4−Tc3) is larger than ΔTc2 or ΔTc3. This is in order to more sharply raise the cooling starting temperature Tn when the amount of high-rate degradation damage |ΣD| has become closer to the power restriction starting threshold ΣDs, to prevent |ΣD| from reaching the power restriction starting threshold ΣDs. By employing such a structure, occurrence of power restriction can be prevented more effectively, and, in turn, reduction in fuel efficiency can be prevented more effectively.

Figure 10:
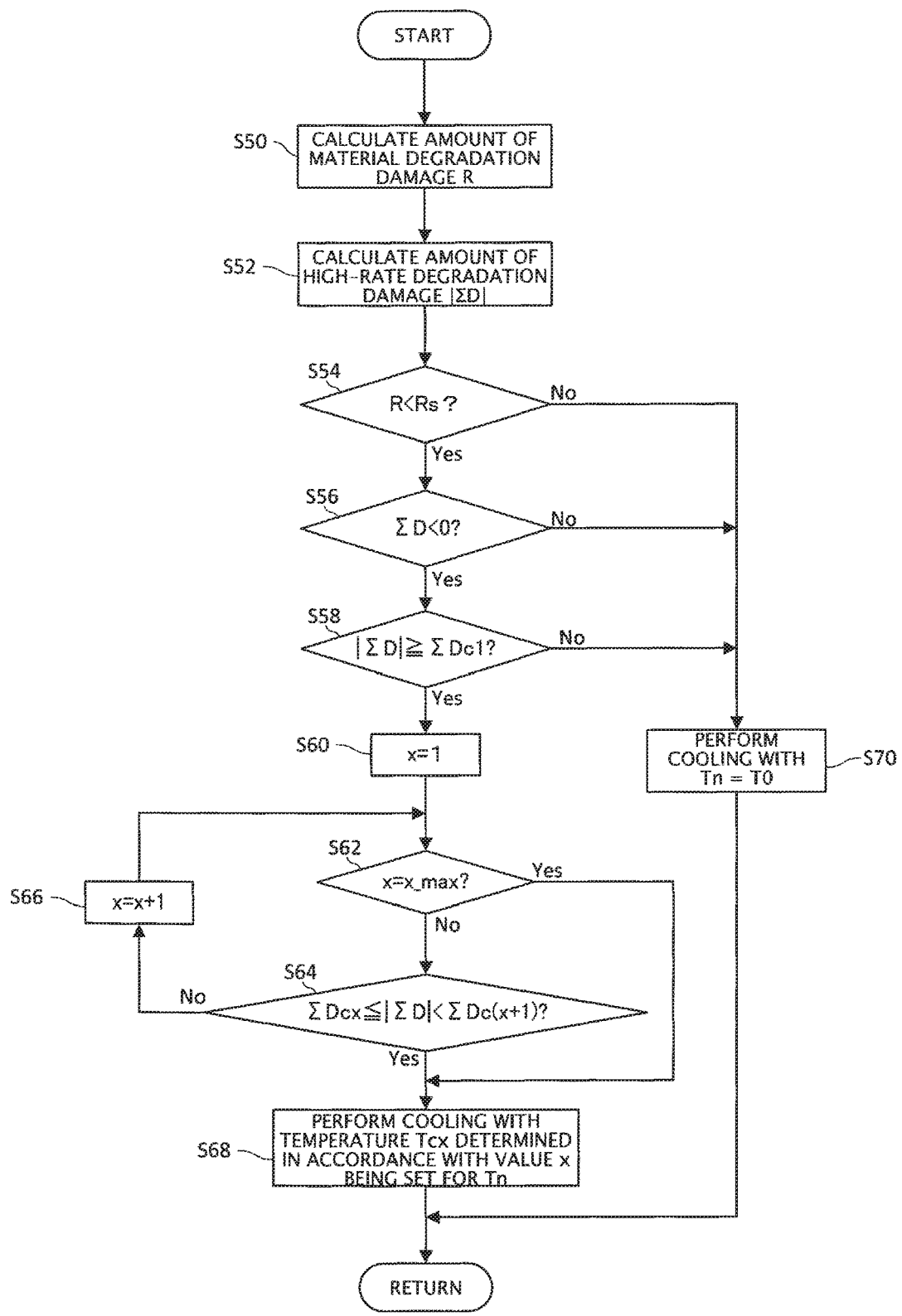
FIG. 10 is a flowchart illustrating a process of cooling of a battery according to a fourth embodiment.

Next, a fourth embodiment will be described below with reference to FIG. 10. FIG. 10 is a flowchart illustrating a process of cooling of the battery 100 according to the fourth embodiment. Although this embodiment is similar to the third embodiment (FIG. 8), the process according to the illustrated embodiment is additionally switched depending on whether or not the amount of high-rate degradation damage |ΣD| is caused by an excess of charge. In the illustrated embodiment, after amounts of damage R and |ΣD| are calculated, it is determined whether or not the amount of material degradation damage R is less than the power restriction starting threshold Rs (S50 through S54). If R<Rs, it is subsequently determined whether or not the calculated high-rate degradation damage ΣD is negative (−), or, in other words, whether or not the obtained amount of high-rate degradation damage |ΣD| is caused by an excess of charge (S56). If ΣD is positive (+), or, in other words, if damage caused by an excess of discharge has accumulated, the cooling starting temperature Tn is not raised, and an initial value T0 is set for the cooling starting temperature Tn (S70). This is because, due to the property that the discharge excess high-rate degradation tends to proceed at temperatures below the freezing point at which it is unnecessary to cool the battery 100, it cannot be expected that raising the cooling starting temperature Tn will effectively retard the progress of the discharge excess high-rate degradation.

On the other hand, if ΣD is negative (−), the process proceeds to step S58, and from then on, in a similar manner as in steps S36 through S46 of the third embodiment (FIG. 8), the cooling starting temperature Tn is set in accordance with the amount of high-rate degradation damage |ΣD| (S58 through S68). As is clear from the foregoing description, in the illustrated embodiment, cooling restriction is performed only when the high-rate degradation damage ΣD is negative (−), or, in other words, only when, in the illustrated embodiment, the amount of high-rate degradation damage |ΣD| is caused by an excess of charge. By employing such a structure, the control can be further simplified because the determination concerning the cooling starting temperature Tn is performed only when necessary.

In the illustrated embodiment, because the charge excess high-rate degradation tends to accumulate at temperatures near the initial value T0 of the cooling starting temperature, the cooling starting temperature is raised in accordance with the amount of charge excess high-rate degradation damage |ΣD|. However, there are some types of batteries 100 in which the discharge excess high-rate degradation tends to accumulate at temperatures near the cooling starting temperature Tn=T0. In such batteries 100, the cooling starting temperature Tn may be raised in accordance with the amount of discharge excess high-rate degradation damage |ΣD|.

Although, in the third and fourth embodiments, the cooling starting temperature Tn is changed stepwise in accordance with the amount of high-rate degradation damage |ΣD|, not only the cooling starting temperature Tn but also other parameters such as the cooling target temperature T* or the rotation speed of the cooling fan 24 may be changed stepwise. In the third and fourth embodiments, the amount of cooling restriction of the battery 100 is increased stepwise (the cooling starting temperature Tn is raised stepwise) in accordance with the amount of high-rate degradation damage |ΣD|. By raising the cooling starting temperature Tn stepwise in this manner, the control can be simplified because short-time fluctuations in the cooling starting temperature Tn are avoided. However, in some embodiments, the amount of cooling restriction (for example, the amount by which the cooling starting temperature Tn is raised) may be changed stepless in accordance with the amount of high-rate degradation damage |ΣD|.

In either case, as lowering of the temperature of the battery 100 is prevented by restricting cooling of the battery 100 when the amount of high-rate degradation damage |ΣD| has reached or exceeded a predefined cooling restriction starting threshold ΣDc1, the progress of the high-rate degradation can be retarded, and, in turn, occurrence of power restriction can be retarded effectively.

The invention claimed is:

1. A secondary battery management device for a secondary battery that is incorporated in a vehicle, the secondary battery management device comprising:
   a cooling mechanism configured to cool the secondary battery; and
   a controller configured to control the cooling mechanism, wherein the controller is configured to calculate an amount of high-rate degradation damage which is an amount of degradation damage to the secondary battery caused by high-rate charge or discharge, and is configured to restrict cooling of the secondary battery by the cooling mechanism when the amount of high-rate degradation damage has reached or exceeded a predefined cooling restriction starting threshold, more strictly than when the amount of high-rate degradation damage is less than the cooling restriction starting threshold.

2. The secondary battery management device according to claim 1,
wherein the controller is configured to calculate an amount of material degradation damage to the secondary battery, and is configured to cool the secondary battery without restricting the cooling regardless of the amount of high-rate degradation damage when the amount of material degradation damage has reached or exceeded a predefined power restriction starting threshold for material degradation.

3. The secondary battery management device according to claim 1,
wherein the controller is configured to increase an amount of restriction on the cooling by the cooling mechanism as the amount of high-rate degradation damage increases.

4. The secondary battery management device according to claim 1,
wherein the controller is configured to perform power restriction to lower a permissible value for at least one of input power and output power to and from the secondary battery when the amount of high-rate degradation damage has reached or exceeded a predefined power restriction starting threshold for high-rate degradation,
wherein two or more additional thresholds are set between the cooling restriction starting threshold and the power restriction starting threshold for high-rate degradation,
wherein the controller is configured to increase an amount of restriction on the cooling by the cooling mechanism stepwise each time the amount of high-rate degradation damage exceeds one of the additional thresholds, and
wherein an interval between one additional threshold and the next additional threshold is set to be smaller as the amount of high-rate degradation damage approaches the power restriction starting threshold for high-rate degradation.

5. The secondary battery management device according to claim 1,
wherein the controller is configured to restrict the cooling of the secondary battery by the cooling mechanism only when the amount of high-rate degradation damage is caused by an excess of charge.

* * * * *